Sept. 22, 1970 J. P. HARVEY 3,529,848
TRACKING TRAILERS
Filed March 7, 1968 2 Sheets-Sheet 1

INVENTOR.
JOHN P. HARVEY.
BY
SETTLE, BATCHELDER & OLTMAN.
ATT'YS.

United States Patent Office 3,529,848
Patented Sept. 22, 1970

3,529,848
TRACKING TRAILERS
John P. Harvey, Grand Haven, Mich., assignor to Harvey Harvesters, Inc., Grand Haven, Mich., a corporation of Michigan
Filed Mar. 7, 1968, Ser. No. 711,258
Int. Cl. B62d *13/06*
U.S. Cl. 280—99           12 Claims

ABSTRACT OF THE DISCLOSURE

A tracking trailer in which all four wheels are steered to follow a common path without skidding of any of the wheels and designed so as to have subsequent trailers likewise track in the same tracks defined by the first trailer. A specific mechanism is incorporated within the rear steering plate of each trailer and the associated rear wheels so as to be capable of having steering of the rear wheels in response to steering of the front wheels and alternatively locking of the rear wheels in parallel condition for backing the trailer or for highway travel.

BACKGROUND OF THE INVENTION

The present invention relates generally to tracking trailers and more particularly to improved mechanism for selectively allowing for steering or non-steering of the rear wheels of a conventional four wheel trailer.

It is well known in a conventional four wheel trailer in which only the front two wheels thereof are steered during pivoting of the drawbar with respect to the trailer, that the rear wheels thereof do not follow in the same tracks or path taken by the powered vehicle or even the path taken by the front wheels of the trailer. This problem becomes even more acute when a plurality of trailers are interconnected in a train and in which only the front wheels of each of the trailers are steered.

Of course, there are many instances in which a plurality of interconnected trailers are required as well as utilization of the power for pulling the trailers as well as the manpower required for such an operation. Thus, for example, in airport operations, it has been customary to interconnect a plurality of luggage trailers for transportation of the luggage from the airplane to an appropriate pick-up station. In such operations, it has been found that the operator must maneuver the plurality of trailers in a rather confined space which necessitates having the trailers tracked in a common path.

While there have been many proposals for the design of a trailer in which all four wheels are steered in a manner that the wheels will follow the same path and subsequent trailers all will track within the same path defined by the front wheels of the first trailer. These trailers have had one serious drawback in that in trying to back the trailers into any confined space, it is virtually impossible to accurately maneuver these trailers due to the four wheel steering.

Recent proposals have been suggested in which the rear wheels of the trailers may be selectively connected to the steering mechanism of the front wheels so as to allow for steering and non-steering of the rear wheels as desired. One such mechanism is disclosed in Pat. No. 3,211,467 issued Oct. 12, 1965. The primary disadvantage of this type of steering and non-steering of the rear wheels is that in order to make such a change, the operator must crawl underneath the trailer and remove and insert several pins to disconnect and/or connect the steering mechanism to the respective wheels. Of course, such a cumbersome manner of providing steering and non-steering is highly objectionable and annoying to the operator as well as being very time consuming.

SUMMARY OF THE INVENTION

The present invention provides a simple and efficient manner for selectively allowing for steering and non-steering of the rear wheels while at all times allowing for steering of the front wheels of a four wheel trailer. This is accomplished by providing a rear steering plate connected with the front steering plate to be rotated relative to the rear axle in response to steering of the front wheels. The rear wheels are connected to a second plate rotated adjacent the rear steering plate to pivot the rear wheels with respect to the rear axle in response to rotational movement of the second plate with respect to the rear axle. Means are provided for selectively connecting the second plate to either plate the axle in which condition the wheels are locked against pivotal movement with respect to the axle or alternatively connecting the second plate to the rear steering plate thereby allowing for steering of the rear wheels.

Thus, the primary object of the present invention is to provide a simple and efficient manner of producing steering or non-steering of the rear wheels of a four wheel trailer while simulanteously allowing for steering for the front wheels at all times.

Another object of the present invention is to provide a mechanism associated with the rear steering apparatus of a four wheel traiiler which is remotely controlled.

A further object of the present invention is to provide a steering mechanism for the rear wheels of a four wheel trailer which can readily be incorporated in many known four wheel steering tracking trailers.

Other objects of this invention will appear in the following description and appended claims reference being had to the accompanying drawings forming a part of this specification wherein like reference characters designate corresponding parts in the several views.

DETAILED DESCRIPTION

Figure 1:
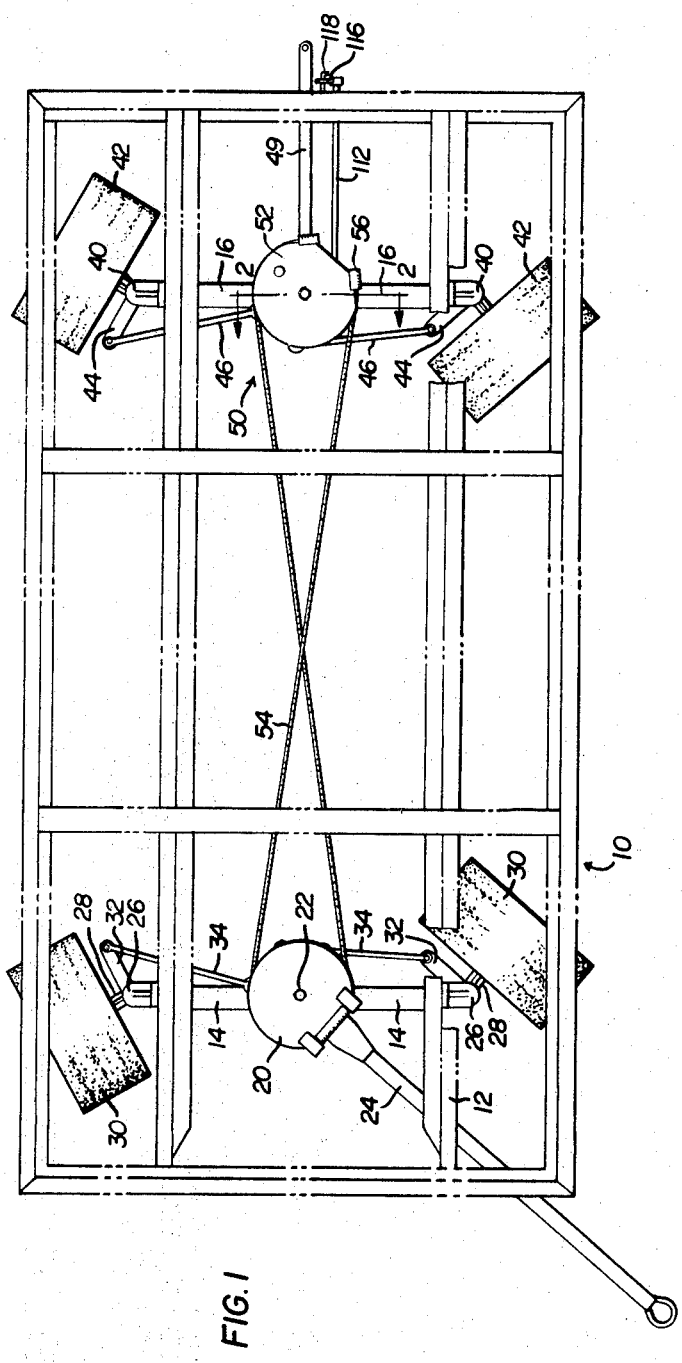
FIG. 1 is a plan view of a tracking trailer showing the cargo space in phantom.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

A trailer constructed in accordance with the present invention is generally designated by the reference character 10 and comprises a frame 12 which is schematically illustrated in the drawings since the frame is conventional and forms no part of the present per se. The frame may either be a separate element forming part of the trailer structure or may be a part of the cargo space conventional with a trailer of this type.

The trailing vehicle 10 includes front and rear axles 14 and 16 extending transversely of the frame 12. The front axle 14 has a steering plate 20 pivoted by a pin 22 with a draft member or towing means 24 fixedly secured to the steering plate or means 20. The opposite ends of the front axle 14 have king pins 26 rotatably mounted thereon which in turn have horizontally extending shafts 28 supporting front wheels 30.

The king pins also each have one end of a lever 32 fixedly secured thereto, the opposite end of which is connected to a tie rod 34. The opposite end of the tie rods 34 are pivotally supported on the front steering plate at a specific location, for a purpose to be described hereinafter.

The rear axle 16 likewise has king pins 40 pivoted on vertical axes at the opposite ends thereof with rear wheels 42 supported by the king pins and a lever 44 fixedly secured to each king pin. The free end of the levers 44 are pivotally connected to one end of tie rods 46, the opposite ends which are connected to the rear steering mechanism 50, which will presently be described. The rear axle also has a bar 49 fixedly secured thereto which extends rearwardly and is adapted to attachment to the tongue 24 of a subsequent trailer.

According to the primary aspect of the present invention, the rear steering mechanism is capable of being attached directly to the front steering mechanism for simultaneous steering of all four wheels or alternatively to be locked in a non-steering position for two wheel steering of the trailer. This is accomplished by the rear steering mechanism 50 which includes a rear steering plate 52 which is attached by a cable 54 to the front steering plate 20. As seen in FIG. 1, the cable 54 is looped around the front plate 20 and fixedly secured thereto with the two reaches of the cable being crossed intermediate the front and rear axles and the free ends thereof connected to lugs 56 carried by the rear steering plate. In this manner, the rear steering plate and rear wheels are turned in a direction opposite to that of the front wheels to provide for proper tracking of the vehicles, in a manner to be described hereinafter.

The rear steering mechanism further includes a second plate or section 60 rotatably supported by a bushing 62 on the pivot pin 53 defining the pivot for the rear steering or first plate 52. The second plate or member 60 has the free ends of the tie rods 46 secured thereto with the connecting points of the respective tie rods being located symmetrically on opposite sides of the center axis C of the chassis or frame 12.

Figure 2:
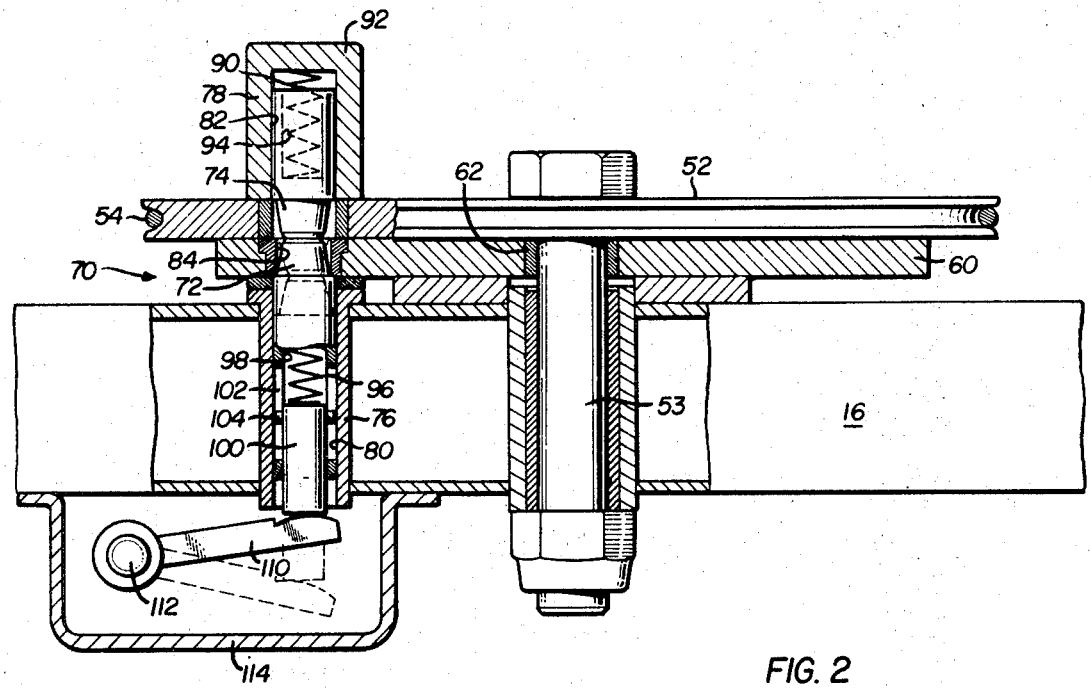
FIG. 2 is a vertical sectional view taken generally along lines 2—2 of FIG. 1.

Means are provided for selectively attaching the rotating member 60 to the steering member 52 or alternatively to the rear axle 16 for non-steering of the rear wheels. The lock-out mechanism 70 for producing steering and non-steering of the rear wheels of the trailer includes first and second pins 72 and 74 reciprocally supported in housings 76 and 78 respectively carried by the axle 16 and the rear steering plate 52. The respective housings 76 and 78 are located on the axle 16 and the rear steering plate 52 so as to define openings 80 and 82 located on a common radius with respect to the pivot member or pin 53 defining the pivot axis for the rear steering plate 52 as well as the plate 60. Likewise, an opening or aperture 84 is formed in the member 60 and disposed on the common radius with the openings 80 and 82. In this manner, the free ends of the respective pins 74 and 76 are in engagement with each other and the axes thereof are aligned when the axle 16, the member 60 and the rear steering plate 52 are located as shown in FIG. 2.

Means are provided for selectively positioning the free ends of the respective pins in a plane disposed between the rear steering plate 52 and the member 60 or alternatively between the members 60 and the axle 16. In the illustrated embodiment, this means includes a compression spring 90 having one end in engagement with the closed end 92 of the housing 78 while the opposite end is received in a recess 94 defined in the pin 74. Pin 72 is likewise biased towards pin 74 by a spring 96 received in a recess 98 with the free end of the pin engaging one end of a member 100. The member 100 is guided within slots 102 by a pin 104 carried by the member 100.

A lever 110 is fixedly secured to a shaft 112 pivotally mounted on the walls of a bracket 114 forming a housing and connected to the axle 16. The lever engages the free end of the member 100, for a purpose to be described later.

The shaft 112 (FIG. 1) extends rearwardly of the axle 16 to a point substantially in alignment with the rear end of the cargo space forming part of the trailer. At the rear end thereof the shaft has a manual control lever 116 fixedly secured thereto with the lever normally being maintained in a first position (shown in FIG. 2) by a bracket 118 fixedly secured to a trailer body and engaging the manual control member 116. The compression springs 90 and 96 are selected to apply forces which will normally maintain the pins in the position shown in FIG. 2 when the lever is in the upper position, likewise shown in FIG. 2. However, the force of spring 90 is greater than the force of spring 96, so that when the lever is moved to the second position shown by the dotted lines in FIG. 2, the force of spring 90 will move the pins to the position shown by the dotted lines in FIG. 2. This will relocate the plane defined by the engaging ends of the respective pins to a second position in alignment with the lower surface of the member or plate 60.

Figure 3:
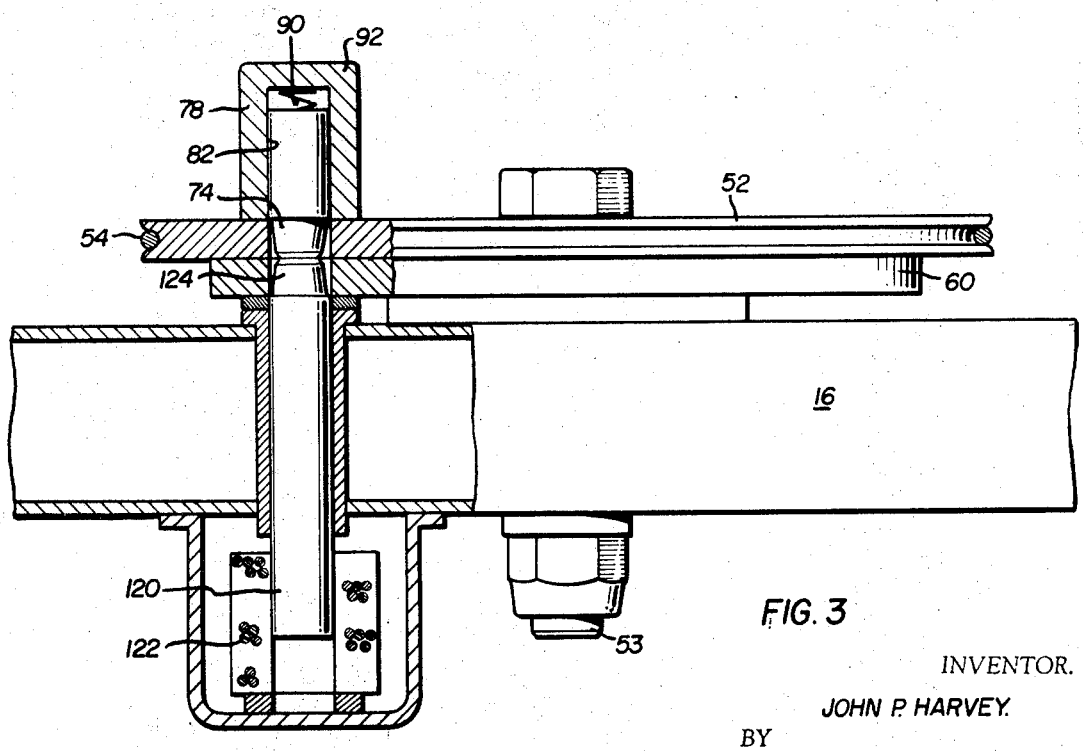
FIG. 3 is a vertical sectional view similar to FIG. 2 showing a slight modification of the invention.

Of course, the movement of the pins 72 and 74 could be effected in various different ways. By way of example, FIG. 3 shows the pin 74 replaced by the spring biased plunger 120 of a solenoid 122 with the upper end of the plunger 122 tapered at 124 in the manner shown with respect to the pin 72. The plunger of course could be electrically actuated through any suitable supply source (not shown) such as the electrical power source of the powered vehicle having the trailer connected thereto. This particular arrangement would be particularly advantageous to provide a remote control located at the operator's compartment of the power vehicle. Furthermore, suitable circuitry could be incorporated so as to automatically actuate the solenoid whenever the steering wheel of the powered vehicle were turned beyond predetermined limits. The reason for this will become apparent hereinafter.

OPERATION

The operation of the trailing vehicle is believed to be apparent from the above description. Thus, during normal operation of the vehicle, for example during highway traveling at higher speeds, the mechanism would be positioned as shown in FIG. 2 wherein the rear steering plate 52 can be rotated with respect to the steering member 60. In this position, the front wheels can be steered as in a normal two wheel steering trailer while the rear wheels are locked in the non-steering position shown by the dotted lines of FIG. 1 by the lower pin 72 being received in the opening 84 defined in the steering member or second plate 60.

However, if it is desired to provide four wheel steering of the particular trailer or trailers, such as for instance if it is desired to cause all of a plurality of trailers in a train to track in a single path, it is only necessary to release the lower pin 72 as by rotating the lever 110 or by actuating the solenoids 122, the greater force of the spring 90 will cause the pin 74 to move downwardly into the opening 84 in the plate or member 60. Of course, this downward movement of the pin 74 will move the pin 72 out of the opening 84 and move pin 74 into said opening thereby locking the steering plate 52 to the member 60 to cause any rotational movement of the steering plate 52 to be transmitted to the rear wheels of the trailer through tie rods 46.

SPECIFIC EXAMPLE OF TRACKING TRAILER

In order to assure tracking of the associated wheels of a plurality of trailers along common paths without skidding of any of the wheels, it is necessary to maintain a critical relationship between various dimensions of the trailer chassis. One specific example of the dimensions of a trailer capable of having all wheels of a trailer train track along two paths is as follows:

In order to have a trailer turn upon a radius of turn of 51 inches, the distance between the two pivot pins 22 and 53 must be 78 inches while the length of the draft tongue of the forward end of the trailer must be 51 inches from the pivot point of the front steering plate 20 to the center connection at the forward end of the draft tongue. Likewise the distance between the connection point of the rear draft tongue 49 of the first trailer measured from the pivot pin 53 must be 25 inches. The distance between the pivot point of the king pins on opposite ends of the respective axles is 37.5 inches while the length of the levers 32 connected to the respective king pins is 5 inches.

In order to insure a greater degree of turn of the inside wheel with respect to the outside wheel on either of the axles, in order to prevent skidding of either of the wheels, it has been found that the connection point of each tie rod must be located 2¾ inches from the center line C of the chassis and the pivot point must be located 4⅞ inches rearwardly of the pivot point of the respective steering plates.

Actual tests have shown that a trailer with these specific dimensions will allow the respective wheels of each trailer to be turned an appropriate amount so as to cause the associated wheels of each trailer to follow a common path when the trailer is conditioned for four wheel steering. Furthermore, even with two wheel steering, the specific dimensions mentioned above will result in a greater degree of turn of the inside wheel with respect to the outside wheel to eliminate any skidding of the respective wheels during a turning movement.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims:

I claim:
1. Steering apparatus for vehicle comprising front and rear axles having wheels pivotally secured to the ends of said axles, front and rear steering plates respectively pivotally supported on said axles and interconnected to turn in opposite directions, drawbar means connected to said front steering plate for pivoting said front plate on said front axle, means separately connecting each of said front wheels to said front steering plate at spaced apart locations thereon, a member supported on said rear axle and connected to said rear wheels, and means selectively connecting said member to said rear steering plate for steering said rear wheels in response to steering of said front wheels and to said axle for locking the rear wheels against pivotal movement with respect to said rear axle allowing for steering of said front wheels.

2. Steering apparatus as defined in claim 1, in which said member comprises a plate pivoted on said rear axle adjacent said rear steering plate.

3. Steering apparatus as defined in claim 1, in which said rear steering plate and member are superimposed and supported on a common pivot axis on said rear axle and said last means comprises a pair of pins having adjacent ends disposed in a plane parallel to said plates and member, and means for selectively positioning said plane between said steering plate and member for non-steering of said rear wheels and between said member and rear axle for steering said rear wheels.

4. A steering mechanism for selectively steering the rear wheels of a trailer having front and rear axles with front and rear wheels respectively supported at opposite ends thereof, comprising a first plate pivotally supported on said rear axle and rotated in response to steering movements of said front wheels on said front axle, a second plate located between said first plate and said rear axle and rotatable on said rear axle, transmitting means interposed between said second plate and rear wheels for transmitting rotation of said second plate to said rear wheels, and movable means optionally connecting said second plate to said first plate for steering of said rear wheels and to said axle for non-steering of said rear wheels.

5. A steering mechanism as defined in claim 4, in which said second plate is rotatable on a common axis with said first plate and said movable means is axially offset from the pivot axis of said plates.

6. A steering mechanism as defined in claim 4, in which said first and second plates have apertures therein and said movable means comprises pins respectively movable in said apertures and supported in housings carried by said first plate and said rear axle, said pins having free ends in engagement with each other and having a first position in said apertures wherein said ends are disposed between said first and second plates and a second position wherein said ends are disposed between said second plate and said axle.

7. A steering mechanism as defined in claim 6, in which said movable means includes biasing means acting on one of said pins for normally maintaining said pins in said second position and means actuatable for counteracting said biasing means to move said pins to said first position.

8. A steering mechanism as defined in claim 7, in which said last means comprises a lever engaging the other of said pins, and remove control means connected to said lever.

9. In a trailer having a chassis including front and rear axles each having wheels pivotally mounted at opposite ends thereof, a front steering plate pivoted on said front axle and connected to said front wheels for steering said front wheels, a drawbar connected to said front steering plate for pivoting said front steering plate, a rear steering plate pivoted on said rear axle and connected to said front steering plate for pivoting on said rear axle in response to steering of said front wheels, the improvement of a first plate located between said rear steering plate and said rear axle having a common pivot on said rear axle with said rear steering plate, means connecting said first plate to said rear wheels for pivoting said rear wheels in response to pivoting of said first plate and means axially offset from the pivot axis of said plates for selectively locking said first plate to said rear steering plate for steering said rear wheels and to said axle for non-steering of said rear wheels while allowing steering of said first wheels.

10. A trailer as defined in claim 9, in which said last means includes means defining openings in said rear axle and said rear steering plate, a first pin reciprocable in an opening in said rear axle and having a free end above said rear axle, a second pin reciprocable in an opening in said rear steering plate, means defining an aperture in said first plate, force applying said acting on said second pin and normally maintaining said second pin in said aperture to lock said first plate to said rear steering plate, and control means operative with said first pin for overcoming said force applying means and moving said first pin into said aperture while moving said second pin out of said aperture for locking said first plate to said axle.

11. Steering apparatus for a vehicle comprising front and rear axles having wheels pivotally secured to the ends of said axles, front and rear steering plates respectively pivotally supported on said axles and interconnected to turn in opposite directions, drawbar means connected to said front steering plate for pivoting said front plate on said front axle, means connecting said front wheels to said front steering plates, a member comprising a plate pivoted on said rear axle adjacent said rear steering plate and connected to said rear wheels, and means selectively connecting said member to said rear steering plate for steering said rear wheels in response to steering of said front wheels and to said axle for locking the rear wheels against pivotal movement with respect to said rear axle while allowing for steering of said front wheels; said rear steering plate and member being superimposed and supported on a common pivot axis on said rear axle and said last means comprising a pair of pins having adjacent ends disposed in a plane parallel to said plates and member, and means for selectively positioning said plane between said steering plate and member for non-steering of said rear wheels and between said member and rear axle for steering said rear wheels.

12. Steering apparatus as defined in claim 11, in which said last means comprises biasing means engaging one of said pins and a remotely controlled member engaging the other of said pins and movable between first and second positions for shifting said plane.

References Cited

UNITED STATES PATENTS

| | | | |
|---|---|---|---|
| 1,242,223 | 10/1917 | Mueller | 280—102 |
| 1,312,788 | 8/1919 | Keller | 280—445 |
| 1,328,048 | 1/1920 | Knapp | 280—445 X |
| 2,651,526 | 9/1953 | Eubanks | 280—99 |
| 2,812,194 | 11/1957 | Ajero | 280—98 X |
| 2,901,265 | 8/1959 | Knight et al. | 280—91 |

KENNETH H. BETTS, Primary Examiner

U.S. Cl. X.R.

280—445